(12) United States Patent
Zack et al.

(10) Patent No.: US 6,930,457 B2
(45) Date of Patent: Aug. 16, 2005

(54) DC MOTOR BRUSH FILTER CIRCUIT

(75) Inventors: Gary E. Zack, Novi, MI (US); Charlie Richlie, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/421,686

(22) Filed: Apr. 23, 2003

(65) Prior Publication Data

US 2004/0066157 A1 Apr. 8, 2004

Related U.S. Application Data

(60) Provisional application No. 60/415,890, filed on Oct. 3, 2002.

(51) Int. Cl.[7] .............................. H02P 5/00; H02H 7/00; H02H 9/08
(52) U.S. Cl. ....................... 318/139; 318/138; 318/254; 318/521; 388/903; 361/8; 361/42
(58) Field of Search ................................ 318/139, 138, 318/254, 483, 629, 65, 794, 795, DIG. 2, 521; 361/15, 1, 2, 8, 42

(56) References Cited

U.S. PATENT DOCUMENTS

| | | | | |
|---|---|---|---|---|
| 4,217,526 A | * | 8/1980 | Farr ........................... 318/139 |
| 4,329,605 A | * | 5/1982 | Angi et al. ................ 310/68 R |
| 4,429,241 A | * | 1/1984 | Ohara et al. ................... 310/51 |
| 4,734,601 A | * | 3/1988 | Lewus ....................... 310/68 E |
| 4,795,951 A | * | 1/1989 | Gaebel et al. .............. 318/293 |
| 4,829,230 A | * | 5/1989 | Perry ......................... 323/273 |
| 4,853,569 A | * | 8/1989 | Lewus ....................... 310/68 E |
| 5,196,750 A | * | 3/1993 | Strobl ........................ 310/239 |
| 5,231,321 A | * | 7/1993 | Takiguchi .................... 310/51 |
| 5,289,089 A | * | 2/1994 | Aoki ............................ 318/254 |
| 5,306,974 A | * | 4/1994 | Bates ........................ 310/68 R |
| 5,402,045 A | * | 3/1995 | Mori ........................... 318/757 |
| 5,525,878 A | * | 6/1996 | Buchanan et al. .......... 318/443 |
| 5,811,948 A | * | 9/1998 | Sato et al. ................... 318/434 |
| 5,838,877 A | * | 11/1998 | Elliot et al. ................. 388/804 |
| 5,869,942 A | | 2/1999 | Miller et al. |
| 5,937,506 A | * | 8/1999 | Nakata ......................... 29/596 |
| 5,942,819 A | * | 8/1999 | Burgess et al. ............... 310/51 |
| 6,078,117 A | * | 6/2000 | Perrin et al. .............. 310/68 R |
| 6,717,301 B2 | * | 4/2004 | DeDaran et al. .......... 310/68 R |

FOREIGN PATENT DOCUMENTS

EP    0 608 581 A1    8/1994
GB    2 217 136 A    10/1989

\* cited by examiner

Primary Examiner—Rina Duda
Assistant Examiner—Patrick Miller
(74) Attorney, Agent, or Firm—Brinks Hofer Gilson & Lione

(57) ABSTRACT

The present invention provides a motor control circuit including a motor with a motor winding and a brush, a battery, a relay, and a ground return circuit. The battery is for energizing the motor. The relay selectively provides connection between the battery and the motor. A ground return circuit is in communication with the brush. The ground return circuit creates a path from the brush through the relay to an electrical ground.

12 Claims, 6 Drawing Sheets

DC MOTOR BRUSH FILTER CIRCUIT

CROSS-REFERENCE TO RELATED APPLICATIONS

The present invention claims priority to U.S. Provisional Application Ser. No. 60/415,890 filed on Oct. 3, 2002, entitled "DC Motor Brush Filter Circuit."

TECHNICAL FIELD

This invention relates to systems and methods for suppressing electrical noise created by DC permanent magnet motors.

BACKGROUND

Designs that use DC permanent magnet motors often make use of filters to eliminate noise from arcing caused by the commutation of the brushes in the motor. Generally a LC low pass filter is used to address the noise issue. In this filter configuration an inductance is placed in series between the switched power feed to the motor and the brush and a capacitor is placed from the switched power feed to ground. This filter topology is effective at filtering brush noise when the motor is running. However, due to the capacitance from the switched power feed to ground and the associated inrush current, this filter configuration can create excessive stress on relays used to control the motor. Moreover, a "pop" in the AM radio each time the motor is switched may result. In cases where the power to the motor is switched often, such as in the operation of intermittent windshield wipers, a repetitive "popping" noise in the AM radio may result. The strength of the "popping" depends on the positioning of the vehicle antenna with respect to the motor and the motor wiring harness, the radio and the strength of the station being received. Intermittent wipers can switch as often as once every two seconds so the "popping" may be unacceptable.

Since the problem is caused by current surges through the wiper wiring harness to support charging of the capacitors in the filter network as well as arcing due to the inductive nature of the motor load, a typical countermeasure has been to reduce the size of the filter capacitors or insert series resistance. The use of either of these methods will cause an increase in brush noise and Electromagnetic Interference (EMI). Typically a balance is struck between acceptable levels of brush noise and AM radio pop. If the level of noise is unacceptable more expensive semiconductor designs that allow current surges to be controlled are used.

Therefore there is a need for a new and improved system and method for suppressing brush noise. The new system and method should eliminate the capacitor surge current but retain the effectiveness of the filter for suppressing brush noise and EMI.

SUMMARY

The present invention solves the problems not addressed by the prior art by repositioning all of the filter capacitors in the LC filter such that there is effectively no capacitance between the switched power feed and ground but there is still an AC path to ground for the brush noise when the relay is closed to operate the motor. The end result is great reduction or elimination of AM radio popping in conjunction with reduced brush noise. Degradation of the switching relay contacts caused by the capacitor charge/discharge current is also eliminated. The new design of the present invention is most effective when the relay to control the motor is located adjacent to the motor, as in integrated wiper control modules, this allows the EMI radiating loop to be kept small.

The present invention provides a motor control circuit including a motor with a motor winding and a brush, a battery, a relay, and a ground return circuit. The battery is for energizing the motor. The relay selectively provides connection between the battery and the motor. A ground return circuit is in communication with the brush. The ground return circuit creates a path from the brush through the relay to an electrical ground.

In yet another embodiment of the present invention, the ground return circuit further includes a capacitor connected at a first end to the relay and at a second end to the electrical ground.

In yet another embodiment of the present invention, comprising a first filter circuit in communication with the brush, wherein the first filter circuit includes an inductor in electrical series connection with the capacitor.

In yet another embodiment of the present invention, the first filter circuit further comprises an inductor in electrical series connection with a capacitor. The capacitor is in electrically parallel connection with the ground return circuit.

In yet another embodiment of the present invention, the motor has a plurality of brushes and the first filter circuit is in communication with at least two of the plurality of brushes.

In still another embodiment of the present invention, wherein the first filter circuit is connected to a first and second brush of the plurality of brushes, the first filter circuit including a first and second inductor, a first end of the first inductor is connected to the first brush, a first end of the second inductor is connected to the second brush, where a capacitor is connected between the second end of the first and second inductors.

In still another embodiment of the present invention, wherein the first filter circuit is in electrical series connection with the ground return circuit.

In yet another embodiment of the present invention, the motor includes a common brush. The motor control circuit includes a second filter circuit in communication with the common brush, the second filter circuit creating a common brush ground path from the common brush to the electrical ground.

In yet another embodiment of the present invention, wherein the second filter circuit comprises an inductor in series with a capacitor.

In another embodiment of the present invention, a method is provided for filtering brush noise of a motor. The motor includes a winding and a brush. The steps of the method include selectively connecting the battery with the motor, energizing the motor, filtering the brush noise, providing a ground path through the relay, and providing a reservoir to supply surge current when the motor is energized.

In yet another embodiment of the present invention, wherein filtering the brush noise included providing the first filter circuit in electrical series connection with the ground path.

In yet another embodiment of the present invention, wherein providing the ground path includes connecting a capacitor between the relay and the electrical ground.

In still another embodiment of the present invention, wherein providing the reservoir to supply a surge current includes connecting a capacitor between the relay and the electrical ground.

In a further embodiment of the present invention, wherein the motor has a common brush, the method further comprising the step of filtering the brush noise of the motor using a second filter circuit, wherein the second filter circuit is connected between the common brush and an electrical ground.

These and other aspects and advantages of the present invention will become apparent upon reading the following detailed description of the invention in combination with the accompanying drawings.

DETAILED DESCRIPTION

Figure 1:
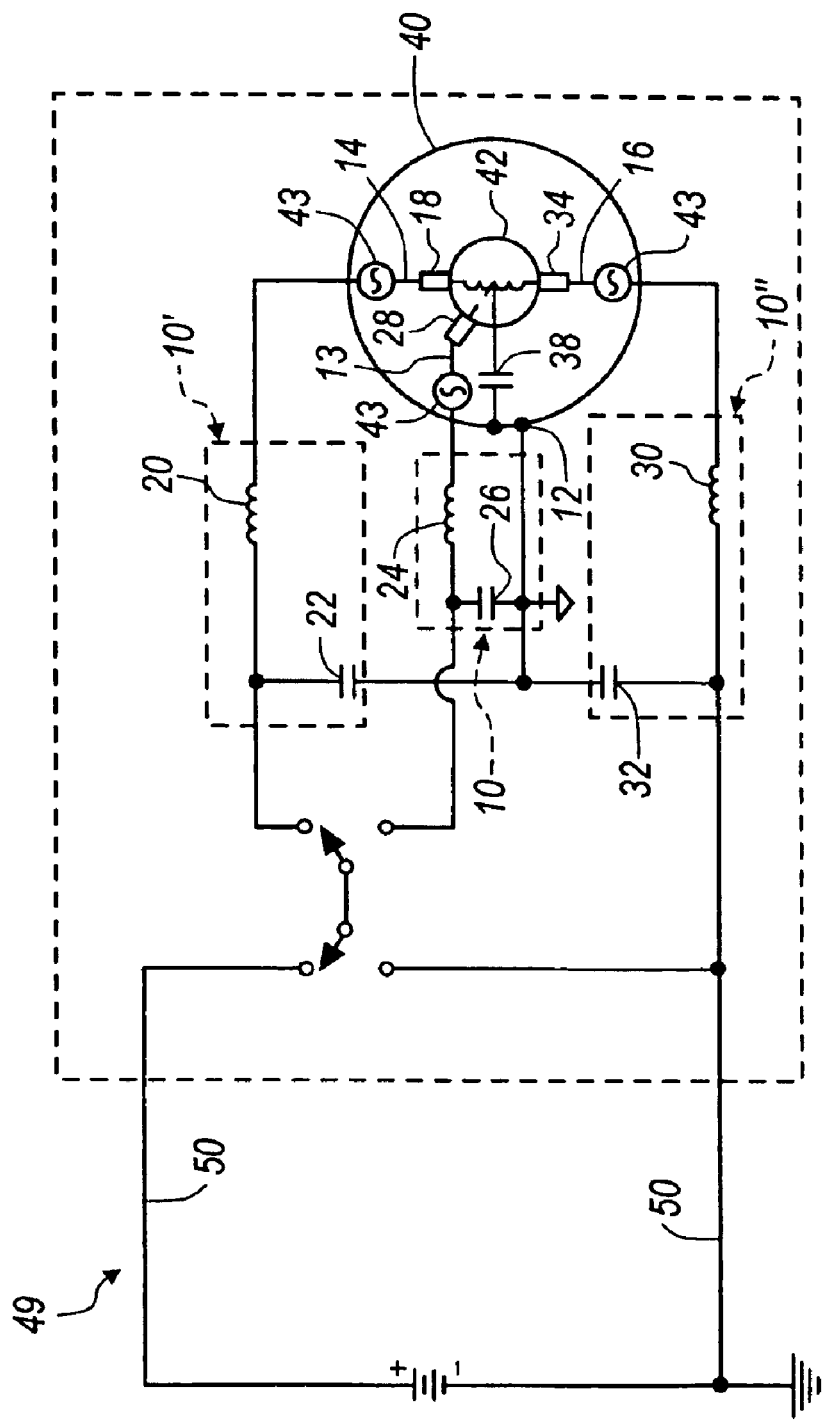
FIG. 1 is a circuit schematic of a prior art LC low pass filter to suppress brush noise.

Now referring to FIG. 1, prior art designs use an LC low pass filter 10, 10', 10" to case ground 12 on each of the brush leads 13, 14, 16 to eliminate noise generated by arcing caused by commutation of the brushes. Components such as inductor 20 and capacitor 22 form a low pass filter to reduce/eliminate noise generated by a low speed brush 18. Inductor 24 and capacitor 26 form a filter to reduce/eliminate the noise generated by a high speed brush 28, while inductor 30 and capacitor 32 form a filter to reduce/eliminate the noise generated by common brush 34. Capacitor 38 represents the parasitic capacitance that exists between the motor case 40 and the armature 42. The AC sources 43 next to each brush 18, 28, 34 are intended to represent conceptually the noise generated by the brush arcing.

Figure 2:
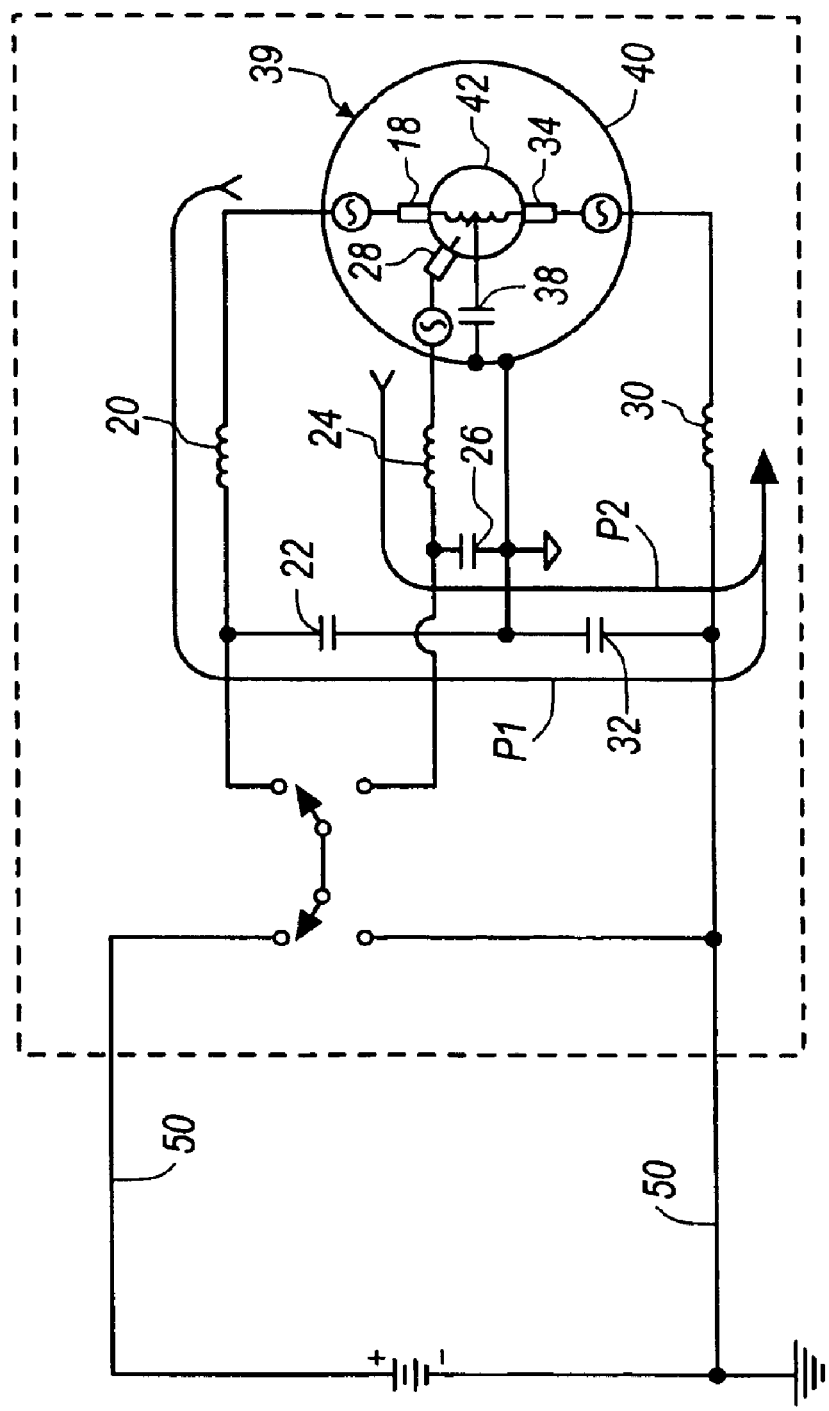
FIG. 2 is a circuit schematic illustrating a brush noise return path in a prior art LC filter circuit for suppressing brush noise.

Filters 10, 10', 10" work by shunting the noise (as indicated by paths P1, P2) generated by brushes 18, 28, and 34 back to the motor 39, as shown in FIG. 2 (prior art). Filters 10, 10', and 10" are most effective if placed close to the source of the noise, in this case the motor brushes 18, 28 and 34. Thus, the loop area available to radiate electromagnetic interference is kept small. For this reason filter 10, 10' and 10" are typically incorporated on the brush card located inside of the motor. If the same filter network (filter 10, 10', 10") were to be placed on the battery side 49 of wiring harness 50 it would be ineffective at suppressing noise. It is also important to note that the unused brush must always be filtered because a generator/transformer effect causes large voltages to be present on the unused terminal when the motor is operating.

Figure 3:
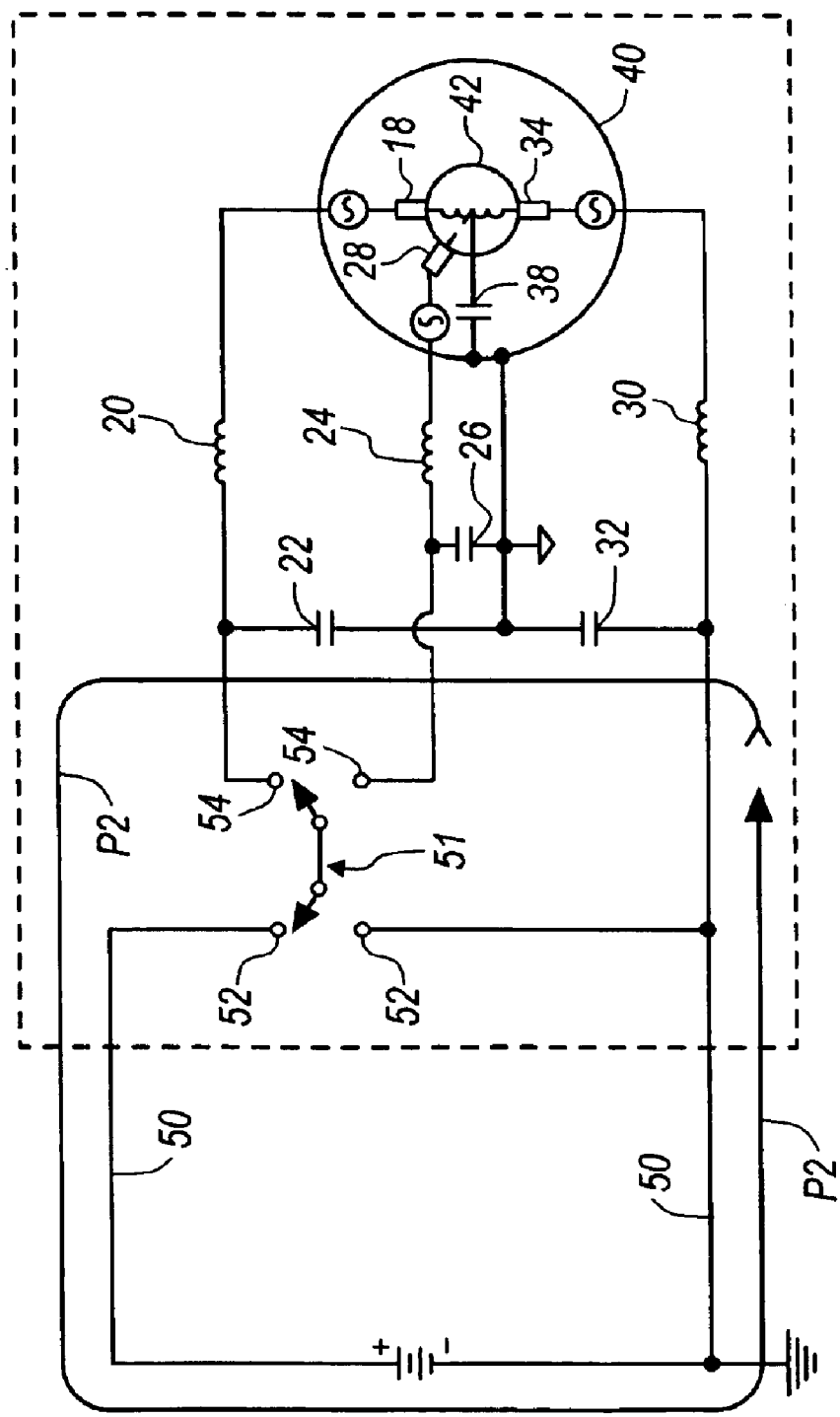
FIG. 3 is a circuit schematic illustrating a capacitor charging surge current path in a prior art LC filter circuit for suppressing brush noise.

Unfortunately, the typical prior art approaches (shown in FIGS. 1–3) (i.e. LC filter circuit topology 10, 10', 10") have some shortcomings when the motor is used in an application that is frequently switched on and off. FIG. 3 illustrates this problem, each time the Run/Park relay 51 is switched to battery, capacitors 22 and 32 must be charged resulting in a surge current through wiring harness 50 and relay 51 contacts 52, 54. If there is an arc at relay 51 contacts 52, 54 due to contact opening or relay bounce the current to support this arc must also flow through wiring harness 50. There are two reasons why this current is undesirable. First, the wiring harness through which the current flows is often long, this greatly increases the likelihood of radiating EMI and causing a "pop" on the AM radio. Second, relay 51 contacts must handle the large capacitor surge current leading to premature degradation of relay 51 contacts. A similar situation results when the relay is moved to the park position discharging capacitors 22, 32 and dynamically braking the motor. The typical solution would be to reduce the size of 22, 32 and 26 or add a resistor in series with these capacitors. Unfortunately, both of these solutions greatly reduce the effectiveness of LC filters 10, 10', 10" in removing brush noise. Typically, a compromise is reached where "the pop" and brush noise are reduced to a level where they are unacceptable only in certain vehicles on weak AM stations. For these vehicles special motor control circuits and other EMI countermeasures can be applied to bring the noise down to acceptable levels.

Figure 4:
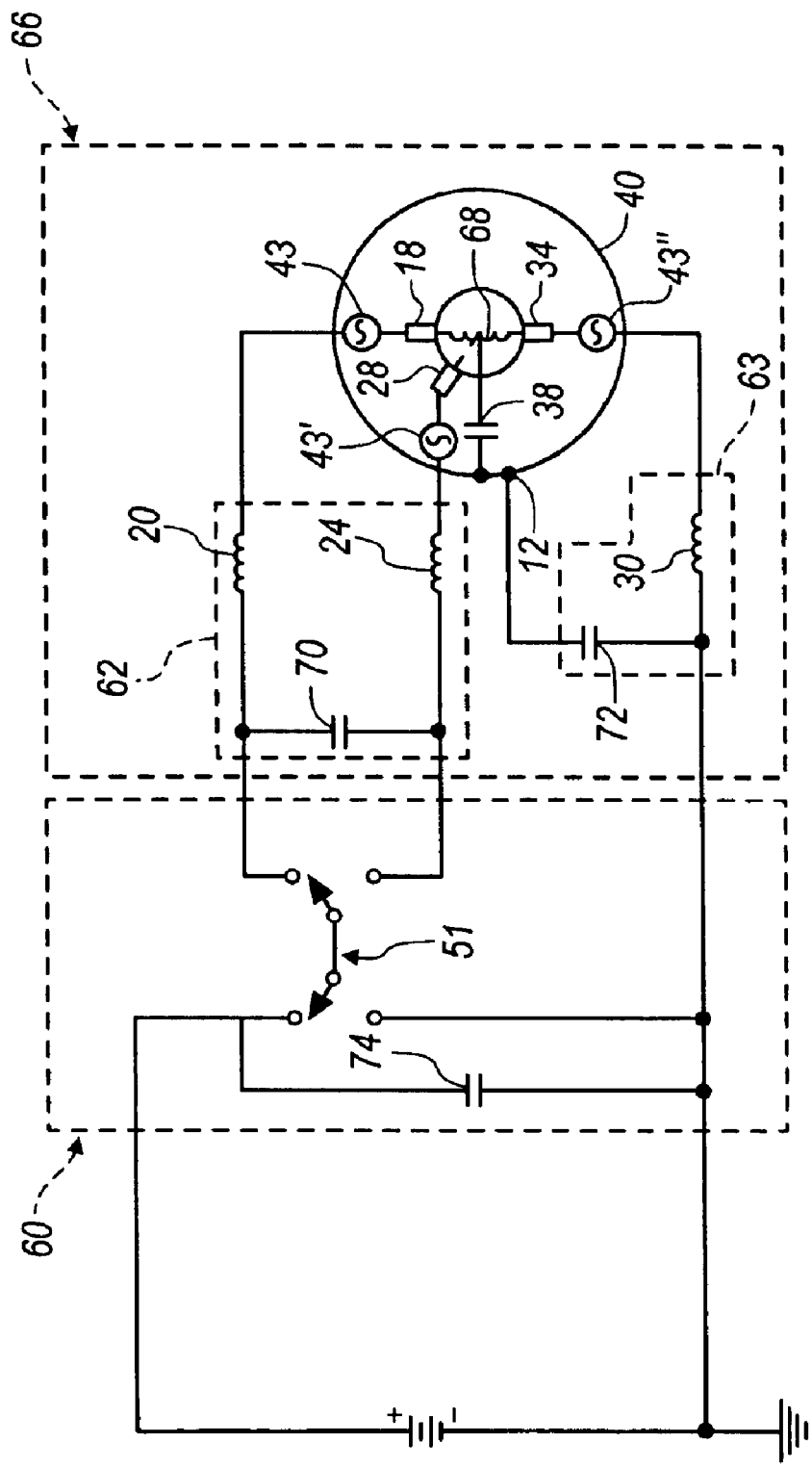
FIG. 4 is a circuit schematic of an LC filter design for suppressing brush noise, in accordance with the present invention.

Referring now to FIG. 4, a control circuit 60 is illustrated located adjacent to a wiper motor and brush card circuit 66. Preferably, brush filters 62, 63 are provided to reduce/eliminate noise 43, 43', 43" generated by brushes 18, 28, and 34. Inductor or motor windings 68 are in series with the LC filter capacitors 70, 72 effectively eliminating surge currents associated with capacitor charging.

Figure 5:
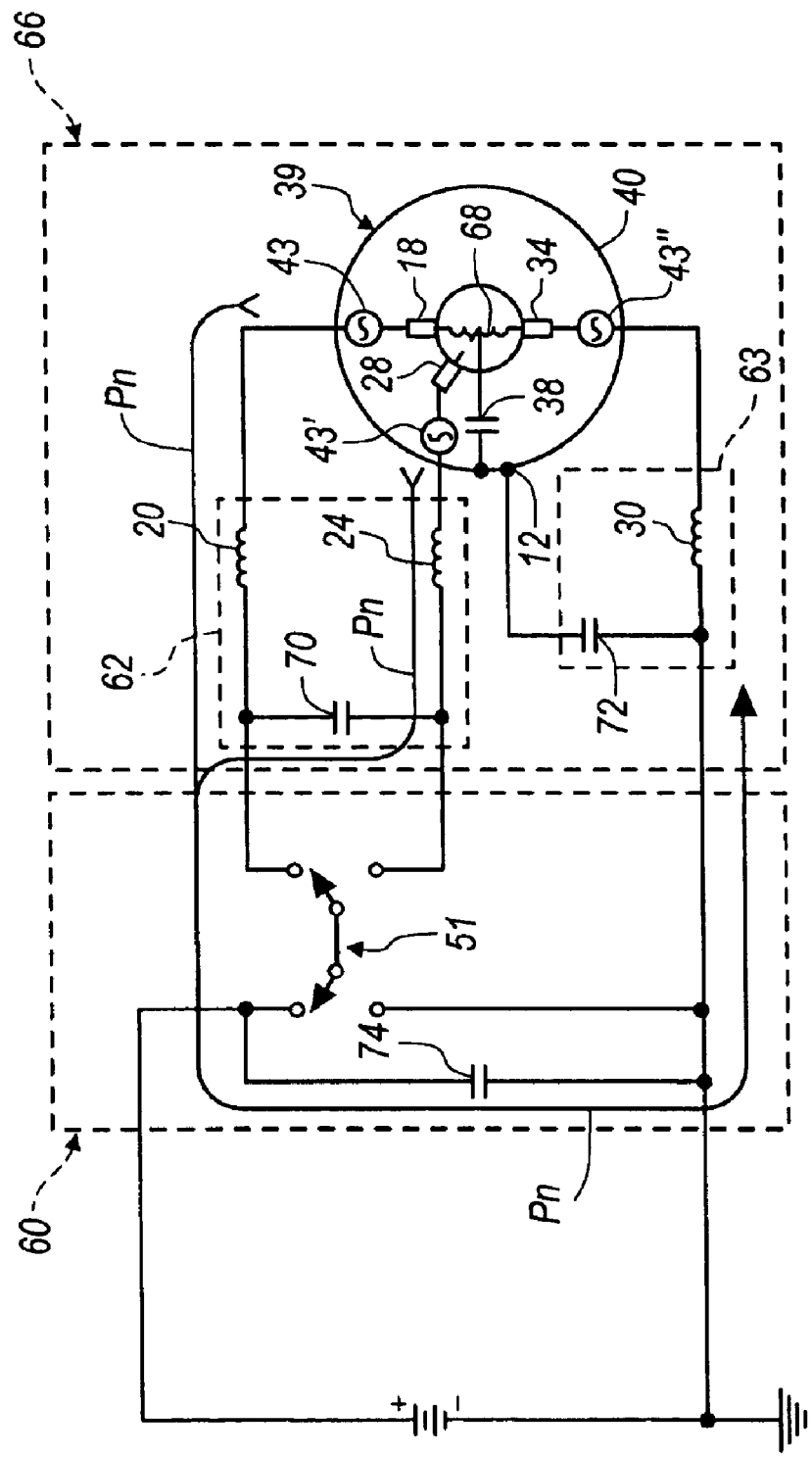
FIG. 5 is a circuit schematic illustrating a brush noise return path for the LC filter circuit for suppressing brush noise, in accordance with the present invention.

FIG. 5 shows the brush noise return path (Pn) in circuits 60 and 66. Note that capacitor 74 now provides the ground return path for the brush noise. In most cases capacitor 74 should be located on the control circuit 60 PWB instead of the brush card 66 PWB due to constraints on relay placement. Although the loop Pn that the brush noise must follow to return to motor 39 is longer than that in conventional brush filter topologies, the brush filters 62, 63 are still effective due to the close proximity of the control circuit 60 to the motor 39. For this reason filter topology of the present invention will be most effective when the control circuitry 60 is integrated into or on the motor 39 itself. As mentioned earlier filter topology of the present invention also eliminates the flow of large capacitor charging currents through the relay contacts.

Figure 6:
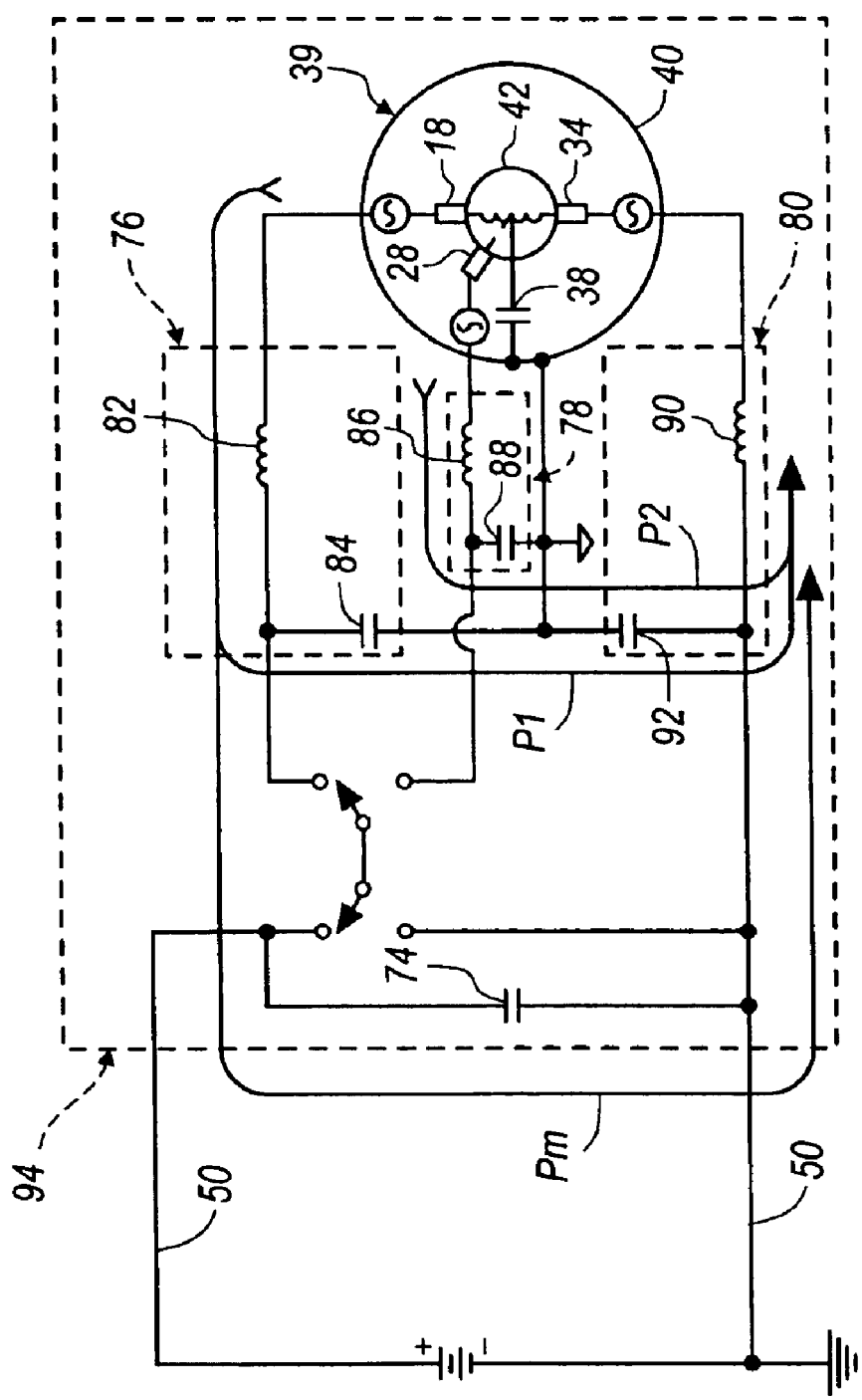
FIG. 6 is a circuit schematic illustrating of a balanced circuit filter design for suppressing brush noise, in accordance with the present invention.

In another aspect of the invention shown in FIG. 6, even higher performance can be achieved by employing a balanced filter topology 94. The balanced topology provides inductor 82 and capacitor 84 to form a low pass filter 76 to reduce/eliminate noise generated by the low speed brush 18. Another filter 78 is formed by an inductor 86 and a capacitor 88 to reduce/eliminate the noise generated by the high speed brush 28, while an inductor 90 and a capacitor 92 form a filter 80 to reduce/eliminate the noise generated by common brush 34. Capacitor 38 represents the parasitic capacitance that exists between the motor case 40 and the armature 42. Capacitor 74 acts as a reservoir from which charge can be drawn to support any capacitive surge currents caused by the filters when the relay is switched. Without the capacitor 74, the surge currents would flow through the harness 50 creating EMI issues. Additionally, in order to prevent excessive surge currents needed to charge the filter capacitors, the value of the capacitors 84, 88, 92 becomes critical. The capacitors 84, 88, 92 must have a capacitance low enough that reservoir provided by capacitor 74 can satisfy the signal surge currents, otherwise the benefit in the reduction of pop and relay degradation will be diminished. FIG. 6 illustrates the brush noise path for the balanced circuit topology. The high frequency components of the brush noise are shunted to the motor 39 (P1 & P2) by the filters without the use of large capacitors. Any remaining brush noise will be shunted back to the motor 39 (Pm) by the capacitor 74. This allows the smallest possible loop area for the high frequency components of the brush noise and does not result in an unbalanced circuit with its associated common mode current. Since the radiated emissions are directly related to common mode currents, the balanced design is more effective at reducing radiated emissions, while at the same time reducing or eliminating the pop generated by typical circuits.

The design of circuits to suppress brush noise in DC permanent magnet motor applications is particularly challenging in applications where the motor is periodically switched on and off. Intermittent windshield wipers are an example of this type of application. There are several noise sources that must be suppressed in this situation each with conflicting requirements. The noise sources include broadband brush commutation noise and intermittent popping sounds caused by current surges associated with capacitor charging and relay contact arcing. In cases where the control circuitry can be located at the motor, the filter topology of the present invention satisfies the multiple conflicting constraints simultaneously, resulting in much improved noise reduction performance.

As any person skilled in the art of DC motor design will recognize from the previous detailed description and from the figures and claims, modifications and changes can be made to the preferred embodiments of the invention without departing from the scope of this invention defined in the following claims.

What is claimed is:

1. A motor control circuit comprising:
    a motor having a motor winding and a plurality of brushes;
    a first filter circuit connected to a first and second brush of the plurality of brushes, wherein the first filter circuit has a first and second inductor and a capacitor, and wherein a first end of the first inductor is connected to the first brush, a first end of the second inductor is connected to the second brush, and the capacitor is connected between the second end of the first and second inductors;
    a battery in communication with the motor for energizing same;
    a relay in selective communication with the battery and the first filter circuit for selectively providing battery power to the motor;
    a ground return circuit in communication with at least one of the plurality of brushes, wherein an electrical return path is created through the relay from the at least one brush back to the motor; and
    a second filter circuit in communication with a third brush, wherein the third brush is a common brush, the second filter circuit creating a common brush ground path from the common brush to an electrical ground, and wherein a second filter circuit includes an inductor in series with a capacitor.

2. The motor control circuit of claim 1, wherein the ground return circuit further comprises a ground return capacitor connected at a first end to the relay and at a second end to an electrical ground.

3. The motor control circuit of claim 1, wherein the first filter circuit includes a second capacitor connected to ground.

4. The motor control circuit of claim 1, wherein one of the first and second inductors is in electrical series connection with the capacitor.

5. The motor control circuit of claim 4, wherein the capacitor of the first filter circuit is in electrically parallel connection with the ground return circuit.

6. The motor control circuit of claim 3, wherein the motor has three brushes and the first filter circuit is in communication with at least two of the three brushes.

7. The motor control circuit of claim 1, wherein the first filter circuit is in electrical series connection with the ground return circuit.

8. A method for filtering brush noise of a motor, the motor having a winding and a plurality of brushes, the method comprising:
    connecting a battery selectively with the motor using a relay connected between the battery and the motor;
    energizing the motor by selectively connecting the battery with the plurality of brushes of the motor;
    filtering the brush noise of the motor using a first and second filter circuit, wherein the first filter circuit is connected to a first and second brush of the plurality of brushes, wherein the first filter circuit has a first and second inductor and a capacitor, and wherein a first end of the first inductor is connected to the first brush, a first end of the second inductor is connected to the second brush, and the capacitor is connected between the second end of the first and second inductors, and wherein the second filter circuit is in communication with a common brush to create a common brush ground path from the common brush to an electrical ground, and wherein the second filter circuit includes an inductor in series with a capacitor;
    providing a return path through the relay from at least one of the plurality of brushes back to the motor; and
    providing a reservoir to supply a surge current to the first filter circuit when the motor is energized, thereby eliminating electromagnetic interference caused by the surge current between the battery and the relay.

9. The method of claim 8, wherein filtering the brush noise includes providing the first filter circuit in electrical series connection with the return path.

10. The method of claim 8, wherein providing the return path includes connecting a ground return capacitor between the relay and an electrical ground.

11. The method of claim 8, wherein providing the reservoir to supply a surge current includes connecting a ground return capacitor between the relay and an electrical ground.

12. The method of claim 8, wherein the motor has a common brush, the method further comprising the step of filtering the brush noise of the motor using a second filter circuit, wherein the second filter circuit is connected between the common brush and an electrical ground.

* * * * *